United States Patent [19]

Palombo et al.

[11] 4,368,937

[45] Jan. 18, 1983

[54] OVERHEAD STOWAGE BIN MECHANISM

[75] Inventors: Mark A. Palombo, Edmonds; Arthur Walkden, Renton, both of Wash.

[73] Assignee: The Boeing Company, Seattle, Wash.

[21] Appl. No.: 235,215

[22] Filed: Feb. 17, 1981

[51] Int. Cl.³ .............. A47B 49/00; B65D 43/24; F16B 39/00
[52] U.S. Cl. .................. 312/325; 312/266; 312/269; 403/21; 411/214; 411/339
[58] Field of Search ............ 312/325, 266, 269, 247, 312/326; 52/708; 411/119, 214, 337, 339; 292/277; 16/71; 308/207 R; 403/21

[56] References Cited

U.S. PATENT DOCUMENTS

| 806,277 | 12/1905 | McKee | 312/266 |
|---|---|---|---|
| 876,159 | 1/1908 | Erickson | 312/266 |
| 893,081 | 7/1908 | Kunan | 411/214 |
| 919,170 | 4/1909 | Holesteine | 411/214 |
| 1,145,264 | 7/1915 | Pflug | 312/266 |
| 2,037,156 | 4/1936 | Taplin | 308/207 R |
| 2,590,341 | 3/1952 | Nabholz | 312/266 |
| 2,885,230 | 5/1959 | Terpin | 403/21 |
| 2,929,474 | 3/1960 | Boardman | 403/21 |
| 3,406,999 | 10/1968 | Kozicki | 312/266 |
| 3,512,328 | 5/1970 | Eriksson | 411/339 |
| 3,790,240 | 2/1974 | Pitner | 308/207 R |
| 4,076,351 | 2/1978 | Wyant | 312/247 |
| 4,102,005 | 7/1978 | Schnarr et al. | 16/71 |
| 4,275,942 | 6/1981 | Steidl | 312/269 |

FOREIGN PATENT DOCUMENTS

| 821444 | 11/1951 | Fed. Rep. of Germany | 411/339 |
|---|---|---|---|
| 2162609 | 6/1973 | Fed. Rep. of Germany | 411/119 |
| 124139 | 3/1919 | United Kingdom | 411/214 |

Primary Examiner—Victor N. Sakran
Attorney, Agent, or Firm—Hughes, Barnard & Cassidy

[57] ABSTRACT

The mechanism allows the bin to be manually moved from a stowed position to a loading position, and requires support arms which are mounted with self-aligning bearings for proper operation. The bearing has three parts: an interior bin mounted needle bearing axle unit; an exterior bin mounted nut; and an axle retainer unit in the arm. Installation and repair are accomplished from the interior of the bin by the turning of the bearing axle bolt which is threaded unto the arm, and upon disconnection from the arm is automatically gripped by a retainer washer for retention inside of the needle housing while the bin is in its loading position and momentarily arrested by a pin connecting both arms. Self-aligning and linear control is accomplished by the substantially wide needle bearing housing providing full support to the solidly mounted axle bolt.

8 Claims, 7 Drawing Figures

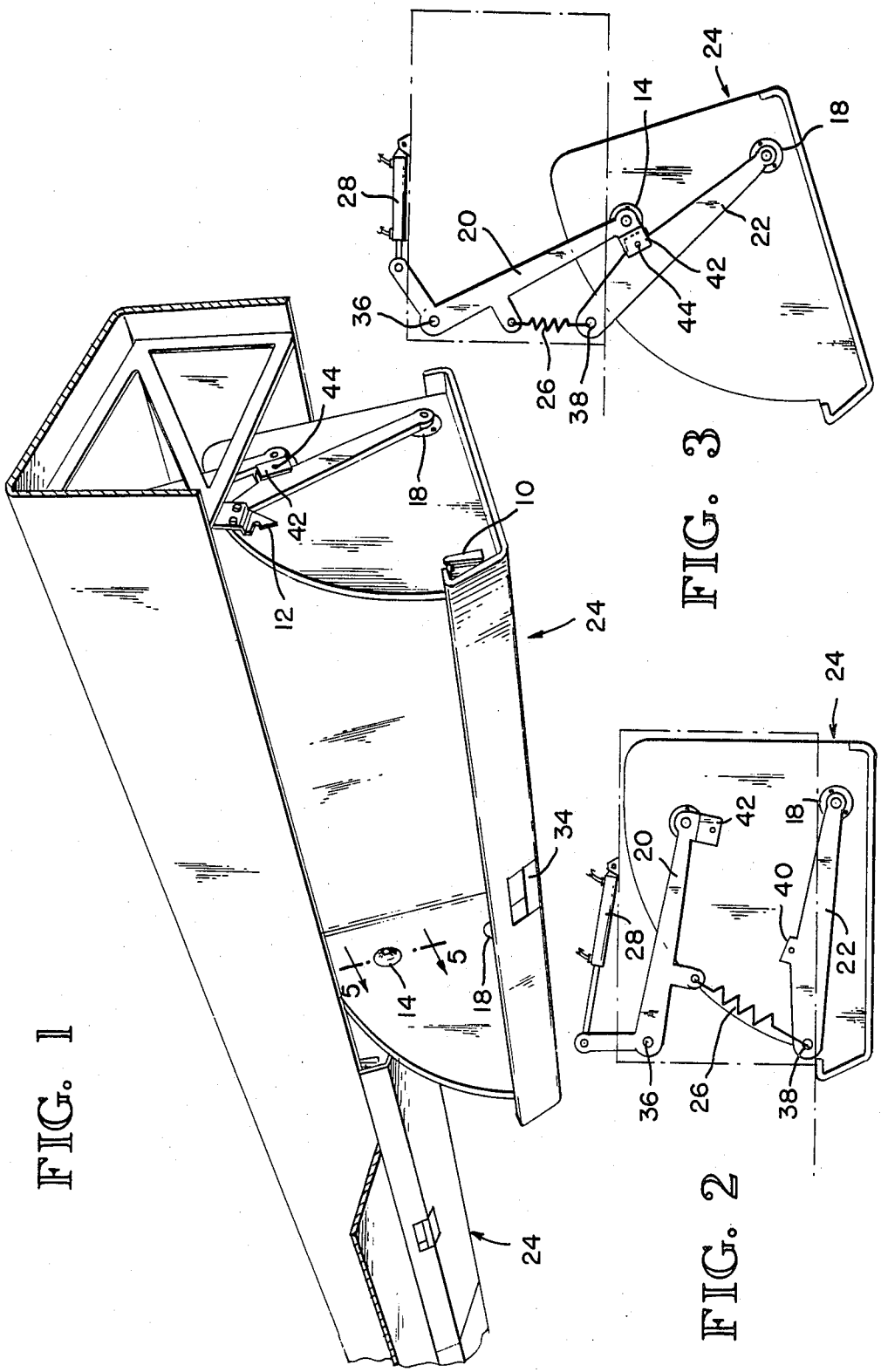

OVERHEAD STOWAGE BIN MECHANISM

BACKGROUND OF THE INVENTION

A. Field of the Invention

This invention relates to an overhead stowage bin mechanism, and more particularly to its self-aligning bearing with improved installation and repair features.

B. Background of the Invention

The present invention is an improved mechanism to the basic mechanism disclosed in U.S. Application Ser. No. 973,424, now U.S. Pat. No. 4,275,942.

The present overhead stowage bin mechanism is particularly adapted for use in passenger airplanes. Each end of the bin is supported by a pair of pivoted arms of unequal length so proportioned that the bin moves from its stowed position downward and slightly forward, at the same time tilting slightly for ease of access. The arms interengage in the down position to increase rigidity. A spring cartridge is connected to each of the upper arms to counterbalance the weight of the bin, and also is arranged to hold the bin in the down position. The upper arms are interconnected by a torque tube, and a snubbing device is also included in the mechanism. However, the most important parts of the mechanism are the self-aligning bearings which are employed between the bin walls and the arms. The mechanism, according to Federal Aviation Administration specifications, must support a 300 pound weight hanging free on the stowage bin without signs of misalignment. Installation or removal of a bin is very cumbersome since a bin is generally mounted in a row of 50 or 60 bins.

In the prior art the bins were mounted to the arms outside of the bin since the inside had to remain flush for luggage. Thus, removal of one bin meant disconnection of the bin next to it in order to gain access for removing arms, bearings, etc. Furthermore, such removal required the presence of two to three repairmen.

Accordingly, the present invention has a specific bearing design which requires only one repairman for bin installation, dismantling, or repair.

The bearing design incorporates three main parts:

(a) a bearing axle retainer, mounted in the arm;

(b) an internal bin self-aligning needle housing with automatic axle retention means; and (c) an external bin flat nut which holds the housing as one unit onto the bin wall.

The only patent of interest which was observed in the art was U.S. Pat. No. 3,512,328 which discloses a male and a female boss assembly associated with a fastener and wherein the bosses are threadably interconnected so as to clamp an associated structure as proposed.

The referenced patent shows some identical features with the bearing axle retainer of the present invention, but fails to disclose the axle retention means, the mounting of the self-aligning needle housing and other specific features designed for the bin mechanism.

Accordingly, the present invention provides for the following advantages and improvements over the prior art:

1. The stowage bin can be replaced by one man, thus allowing a great savings in maintenance and installation costs.

2. The stowage bin has self-aligning needle bearings which are so designed as to prevent rocking of the bin; thus, perfect linear control is obtained when the bin is moved from stowage to loading position.

3. The bin material, as well as the clamping boss material, does not require a flush surface as required in the prior art to enhance alignment.

4. The bearing unit can be installed on bin materials of different thicknesses without losing any of its properties and advantages.

5. The bin can be removed or installed without disturbing adjacent bins.

6. The internal bin bearing mountings have no hard edges for luggage to be caught on.

SUMMARY OF THE INVENTION

The present invention is an improvement to an overhead stowage bin mechanism which utilizes a pair of arms at each side of the bin and allows the bin to be moved from a stowed to a loading position, as is well known in the art. The present improvement resides mainly in the bearing design which results in a self-aligning feature and a one-man installation procedure. It will be realized that this invention is very significant to repair operations. For example, in a Boeing 747 commercial airplane, there may be a row of 50 bins next to each other. Repairing one meant one had to be able to reach inbetween the adjacent bins and thus two bins, one at each side, had to be partly disengaged in order to repair the bin inbetween, because the mounting mechanism is at the outside of the bin.

The herein disclosed invention provides improved alignment and removal or installation of one bin from within the bin without removal of adjacent bins by one person. The present self-aligning bearing mechanism has three parts, the first part being a bearing axle retainer. This is an externally threaded part which is threaded into the arm and anchored permanently in place by means of conventional deforming slots which are perpendicular to the threads. The threaded part is concave and carries an internally mounted threaded bolt with a self-locking feature of a ratchet-washer arrangement. This part is a staple item. The second part is a housing having a specifically designed width which contains two sets of needle bearings, approximately 80 total. In the center of the two sets of needle bearings is an axle-bolt which is fully supported over its complete length by the needle bearings. The axle bolt has a hollow internally threaded end which upon installation mates and locks with the external threads of the internally mounted threaded bolt of the axle retainer in the arm. Furthermore, the axle bolt has a circumferentially positioned groove at its end which serves as a stop to a spring washer which is positioned around the axle bolt; however, the washer-stop or axle bolt retention will only happen when the axle bolt is removed from the axle retainer. The third part is a nut which is positioned at the outside of the bin and serves to retain the self-aligning needle bearing housing with retention axle bolt onto the bin.

Having thus described the features and advantages of the present invention, other features and advantages of the bin mechanism will become further apparent from the following description presented in conjunction with the accompanying drawings, hereinafter defined in detail.

BRIEF DESCRIPTION OF THE DRAWINGS

FIG. 1 shows a pair of overhead stowage bins, one in a fully opened loading position.

FIG. 2 is a side elevation of the bin mechanism when the bin is in a stowed or closed position.

FIG. 3 is a side elevation of the bin mechanism when the bin is in an opened or loading position.

DETAILED DESCRIPTION OF THE INVENTION

Figure 5:
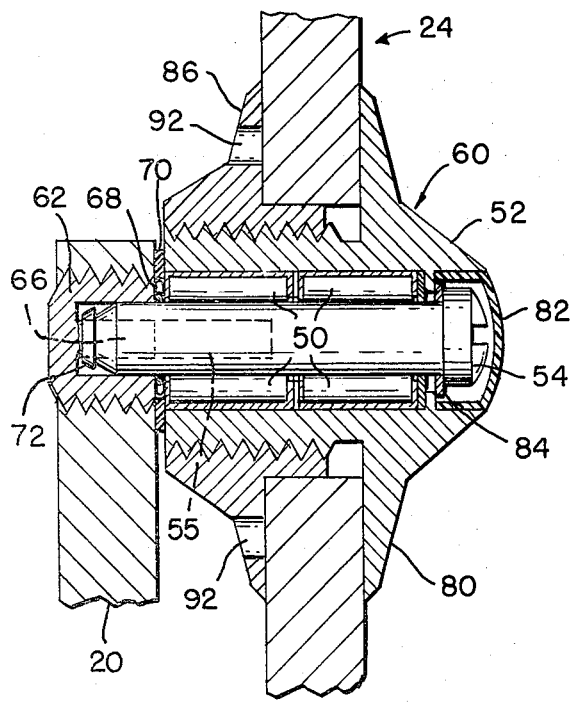
FIG. 5 is a cross section through the center of a bearing arrangement in an installed position, as along line 5—5 of FIG. 1.

As illustrated in FIG. 2, the arms 20 and 22 provide for a stowed position of the bin 24 by the locking of mechanisms 10 and 12, the spring 26 and snubber 28 force holding the arms 20-22, mounted at the airplane structure pivot points 36 and 38. Upon pulling the handle 34 downwards, the bin 24 becomes unlocked from the locking mechanism 10-12 as illustrated in FIG. 1 and stops in a slanted loading position while the arms 20 and 22 grab each other at the center flange 40 and the fork portion 42, which provides for a sturdy non-rocking position as illustrated in FIGS. 1 and 3. Upon installation, dismantling, or repair by only one man, in accordance with the present invention, it appears essential to retain the arms in a locked position by temporarily connecting the two arms 20 and 22 by the insertion of a locking pin 44 through the holes in fork 42 and flange 40. Accordingly, a locking means is provided between the two arms 20 and 22 at each side of the bin 24. Linear control during bin transition from the stowed position to the loading position is obtained by the uniquely designed self-aligning bearings 14 and 18 which are provided with the needle bearings 50 located inside of a housing 52. Preferably two sets of needle bearings next to each other, as illustrated in FIG. 5, are utilized. As illustrated further, the width of the housing, which is almost equal to the length of the axle bolt 54, provides for proper support of the axle bolt 54 and thus forms a sturdy linear alignment feature. The complete bearing mechanism 60 has three main parts. The axle retainer 62, which comprises an external threaded part with locking slots 64 which are deformed when the retainer 62 is threaded into the arm so that the retainer is permanently positioned. Inside of retainer 62 is an externally threaded bolt 66 which has a ratchet-washer locking means (not shown) so that when the axle bolt 54, which has an internal threaded portion 55, is screwed onto the retainer bolt 66, the axle bolt 54 becomes mounted and locked. Loosening by vibration or the like is prevented by the ratchet washer locking means. This self locking feature is part of the conventional retainer 62 which is a shelf vendor item.

Figure 4:
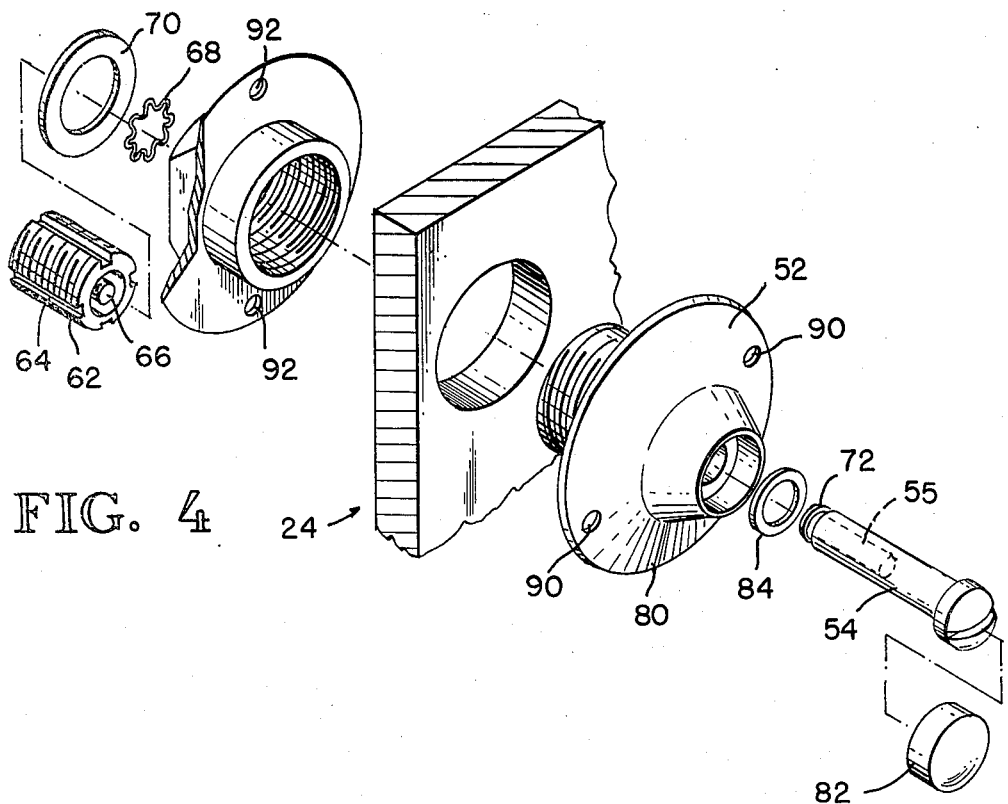
FIG. 4 is an exploded view of the bearing arrangement.
Figure 6:
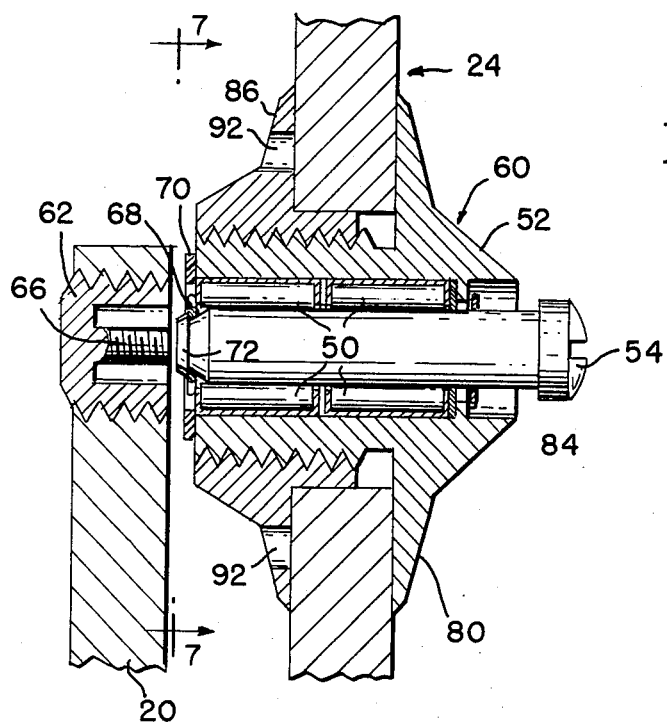
FIG. 6 is a cross section of the bearing arrangement when the axle bolt is disconnected from the arm and becomes retained to the bearing self-aligning needle housing.
Figure 7:
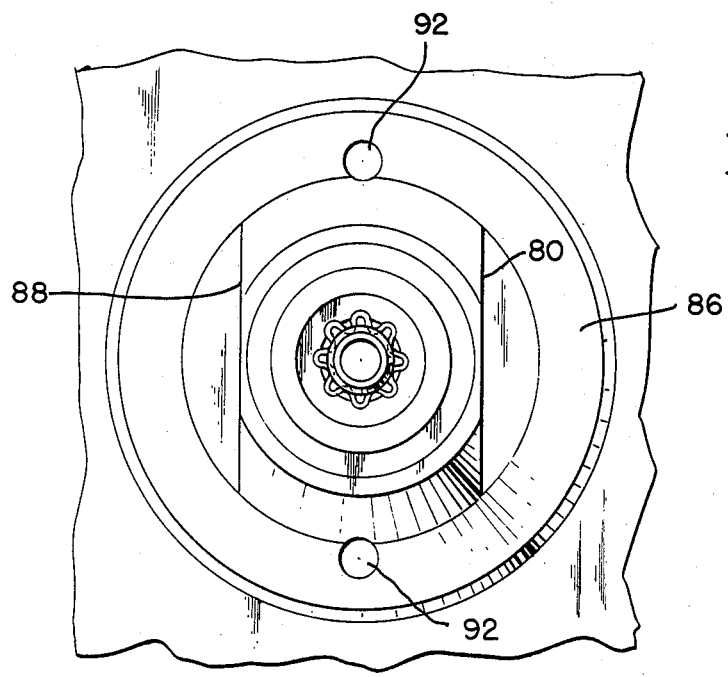
FIG. 7 is an elevation taken along line 7—7 of FIG. 6.

A spring retention washer 68, which fits within the teflon washer 70, becomes an automatic lock or holding means to the axle bolt 54. For instance, when the axle bolt is unfastened from an installed position (see FIGS. 5 and 6), the washer 68 will slide over the bolt and snap into the groove 72 on the end of the axle bolt 54. Accordingly, the axle bolt 54 will always be retained to the needle bearing housing 52. The unique bearing mechanism and the ability to lock the arms 20 and 22 when the bin 24 is in the loading or folded out position provides one man with the opportunity to install or dismantle a bin 24 when standing at a location near the handle 34. He can replace a damaged bin 24, remove and install the bearing mechanism parts, all within a minimum of time compared to the arrangement of conventional bin installations. In order to maintain an overall smoothness in the bin 24, a cap 82 can be placed over the axle bolt 54 head, thus a smooth housing surface 80 and cap 82 will prevent sharp interference with luggage. Furthermore, a washer 84 is located under the axle bolt 54 head in the preferred embodiment, as illustrated in the exploded version in FIG. 4. The third part of the bearing mechanism is the locking nut 86 which is provided with flat flanges 88 and holes 92 for screwing the locking nut 86 by wrench or spanner wrench to the housing 52 as illustrated in FIG. 7. In order to hold the housing 52, which has a smooth surface and thus presents a holding problem, a pair of holes 90 similar to holes 90 are provided.

And now, therefore, we claim:

1. In combination with a stowage bin assembly of the type comprising a fixed supporting structure and a stowage bin having a pair of spaced generally parallel sidewalls, said bin being supported from said structure by first and second pivotal mounting means with said first and second pivotal mounting means each including (i) a first arm pivotally secured adjacent its outboard end to said supporting structure and pivotally secured adjacent its inboard end to the outer surface of a respective one of said spaced generally parallel bin sidewalls, (ii) a second arm pivotally secured adjacent its inboard end to the outer surface of said respective one of said spaced generally parallel sidewalls at a point spaced from and below the point of pivotal connection of said first arm to said bin sidewall, and (iii) interconnecting means pivotally secured to the outboard end of said second arm and to said first arm at a point intermediate its inboard and outboard ends whereby said first arms, second arms, interconnecting means, and the associated bin sidewalls define a pair of four-bar linkage assemblies interconnecting said bin to said supporting structure with freedom for relative pivoting movement with respect thereto about the points of pivotal connection of said outboard ends of said first arms to said support structure between a first stowed upper position and a second lower open accessible position permitting of loading and/or unloading of material to be stowed in said bin; an improved self-aligning bearing assembly means for pivotally yet removably interconnecting the inboard ends of at least said first arms to respective different ones of said bin sidewalls whereby said bearing assembly means may be readily assembled and/or disassembled from the interior of said bin so as to permit ease of installation and/or removal of said bin from said supporting structure, said improved self-aligning bearing assembly means comprising: a housing mounted on the interior of each of said bin sidewalls and extending laterally through said sidewalls, said housings carrying needle bearing elements defining an elongated axle hole passing through each of said bin sidewalls; an axle bolt having a threaded end portion extending laterally and outwardly through each of said axle holes defined by said needle bearing elements; and, a self-locking threaded bolt mounted on the inboard end of each of said first arms cooperating with, and removably fastened to, the threaded portion of said axle bolt so as to form a pair of self-aligning bearing assemblies pivotally interconnecting the inboard ends of said first arms to the outer surfaces of respective different ones of said bin sidewalls and permitting of disassembly and/or reassembly of said self-aligning bearing assemblies by unthreading and/or threading said axle bolts from said self-locking bolts from the interior of said bin.

2. The combination as set forth in claim 1 wherein said threaded end portion of said axle bolt is an internally threaded portion and said self-locking threaded bolt mounted on said first arm is externally threaded and cooperable therewith.

3. The combination as set forth in claims 1 or 2 wherein said housing includes a removable smooth cap covering the inboard end of said axle bolt so as to prevent damage to the stowed contents within said bin.

4. The combination as set forth in claims 1 or 2 wherein said interconnecting means coupling the inboard ends of said second arm to a point intermediate the opposite ends of said first arm comprises spring cartridge means for counterbalancing the weight of said bin and for releasably holding said bin in the down position when said bin is open.

5. The combination as set forth in claims 1 or 2 wherein cooperable mutually engageable abutment means are formed on said first and second arms for limiting relative motion of said arms about their respective pivot points.

6. The combination as set forth in claim 5 wherein locking means are provided for releasably locking said cooperable mutually engageable abutment means together when said bin is in its downward open position.

7. The combination as set forth in claims 1 or 2 wherein means are provided for retaining said axle bolt captive within said housing when said axle bolt is threadably disconnected from said self-locking threaded bolt.

8. The combination as set forth in claim 1 or 2 wherein second improved self-aligning bearing assembly means identical to said first mentioned improved self-aligning bearing means are employed to pivotally yet removably interconnect the inboard ends of said second arms to respective different ones of said bin sidewalls wherein said bin may be readily assembled to and/or removed from each of said first and second arms from the interior of said bin.

* * * * *